J. C. Gaston,
Hand Stamp.
No. 92.600.  Patented July 13 1869.
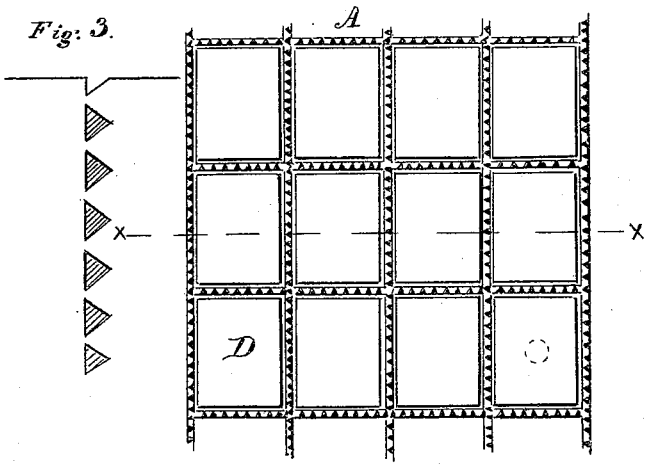

UNITED STATES PATENT OFFICE.

J. C. GASTON, OF CINCINNATI, OHIO.

IMPROVEMENT IN PAPER-PERFORATORS.

Specification forming part of Letters Patent No. 92,600, dated July 13, 1869.

*To all whom it may concern:*

Be it known that I, J. C. GASTON, of Cincinnati, in the county of Hamilton and State of Ohio, have invented certain new and useful Improvements in Devices for Perforating Sheets of Postage-Stamps, Coupons, &c.; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to devices for perforating or puncturing sheets of postal currency, coupon-tickets, &c., so that the stamps or coupons may be easily separated; and it consists in the novel construction and arrangement of metallic plates with cutting-teeth upon their edges, of a peculiar form for that purpose.

In the drawings, Figure 1 is a plan view. Fig. 2 is a vertical section on the line $x\ x$ of Fig. 1, and of a block used to press upon the surface of the frame shown in said Fig. 1. Fig. 4 are views of detached portions, and Fig. 3 are views of the shape of the perforations.

In perforated sheets of postage-stamps, coupon-tickets, &c., it is customary to punch out a series of small circular holes with a series of small punches and corresponding dies. The machinery used is expensive, because of the difficulty of keeping such small punches in order. The only purpose of this perforation is to enable the stamps or coupons to be easily separated on the lines running between them. To furnish a cheaper device, and one that will accomplish the same result in equally as good a manner, is the object of my invention.

I take metallic plates A, of any suitable width, length, and thickness, and by the use of a milling-tool, made for that purpose, cut a series of teeth, B, upon the front edge of these plates, in shape on the side to which the tool is applied, as clearly shown in Fig. 4. The opposite side of this edge I grind away sufficiently to make the point of the teeth, as well as the angle at their base on that side, sharp enough for cutting purposes. The teeth thus made are of peculiar form, and for some distance from their points will make triangular perforations. The angles $a$, formed by the side of the teeth on the ground side of the plate, will be sharp, or sufficiently so to make an impression on the material that may be perforated by them. The form of the teeth is as shown in Fig. 4, and the shape of the perforations made by them is as shown in Fig. 3. The metallic plates thus provided with these peculiarly-shaped teeth B, I arrange in a frame, C, so that the lines of teeth will form rectangular figures corresponding in size and shape with the stamps or coupons to be surrounded with the perforations, as shown in Fig. 1. Within each of the spaces or figures thus made I place a loosely-fitting plate or follower, D, and connect it to a stem, E, surrounded by a coiled spring, F, or elastic rubber G, so that the follower-plate D may be pressed down vertically a short distane, and be promptly returned to its original position, all as clearly shown in Fig. 2.

In operating my device I place the sheets of postal-stamps or of coupons, or whatever else I desire to perforate, upon the face of the lines of teeth of the metallic plaes, as shown in Figs. 1 and 2. I then by any suitable mechanical means press the block H upon the sheets, when the teeth are forced through them, making perforations in form similar in shape to the figures shown in Fig. 3. The followers D are driven back; but as the block H is withdrawn the followers D carry the sheets thus perforated up and off from the lines of teeth. The sheets can then be removed and others perforated, and thus the work can be kept on till completed.

Having thus described my invention, what I claim is—

The metallic blades or plates A, having their their teeth B constructed in form and shape substantially as herein shown and described, for the purpose of perforating sheets of postage-stamps and similar articles, as set forth.

J. C. GASTON.

Witnesses:
P. T. DODGE,
L. HAILER.